United States Patent
Liang et al.

(10) Patent No.: US 8,842,991 B2
(45) Date of Patent: Sep. 23, 2014

(54) METHOD OF PROVIDING END-TO END CONNECTION IN A UNIFIED OPTICAL AND COAXIAL NETWORK

(75) Inventors: Haixiang Liang, Atherton, CA (US); Liming Fang, Cupertino, CA (US); Jim Chen, Corona, CA (US); Hesham El Bakoury, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/535,581

(22) Filed: Jun. 28, 2012

(65) Prior Publication Data

US 2013/0004155 A1    Jan. 3, 2013

Related U.S. Application Data (60) Provisional application No. 61/502,273, filed on Jun. 28, 2011.

(51) Int. Cl.
  *H04B 10/00* (2013.01)
  *H04Q 11/00* (2006.01)
  *H04L 12/28* (2006.01)

(52) U.S. Cl.
  CPC ........ *H04Q 11/0067* (2013.01); *H04L 12/2801* (2013.01); *H04Q 2011/0079* (2013.01); *H04Q 11/0071* (2013.01)
  USPC .............................................. 398/72; 398/66

(58) Field of Classification Search
  USPC ..................................................... 398/66–73
  See application file for complete search history.

(56) References Cited

U.S. PATENT DOCUMENTS

| | | | | |
|---|---|---|---|---|
| 7,379,676 B2* | 5/2008 | Kang et al. | | 398/168 |
| 7,653,084 B2* | 1/2010 | Shin et al. | | 370/468 |
| 7,852,867 B2* | 12/2010 | Tsang et al. | | 370/428 |
| 7,940,703 B2* | 5/2011 | Roy | | 370/260 |
| 8,254,441 B2* | 8/2012 | Sun | | 375/240.01 |

(Continued)

FOREIGN PATENT DOCUMENTS

WO        2011031831 A1    3/2011

OTHER PUBLICATIONS

"Part 3: Carrier Sense Multiple Access with Collision Detection (CSMA/CD) Access Method and Physical Layer Specifications," IEEE Standard for Information Technology-Telecommunications and Information Exchange Between Systems-Local and Metropolitan Area Networks-Specific Requirements, IEEE Standard 802.3-2008, Section 5, 2008, pp. 1-615.

(Continued)

*Primary Examiner* — Agustin Bello
(74) *Attorney, Agent, or Firm* — Conley Rose, P.C.; Grant Rodolph; Brandt D. Howell (57) ABSTRACT

A method in a network device for providing end-to-end connection in a unified optical and coax network, comprising receiving at an integrated node device (IND) a frame from an optical line terminal (OLT), wherein the frame comprises a data frame and a logical link identifier (LLID), and placing the data in a one of a plurality of buffers based on the LLID, wherein the one of the plurality of buffers corresponds to a customer premises equipment (CPE) associated with the LLID, wherein the data frame stays intact in a media access control (MAC) layer.

21 Claims, 7 Drawing Sheets

(56) References Cited

U.S. PATENT DOCUMENTS

| | | | |
|---|---|---|---|
| 2004/0109450 A1* | 6/2004 | Kang et al. | 370/390 |
| 2011/0032948 A1* | 2/2011 | Yu et al. | 370/442 |
| 2011/0058813 A1* | 3/2011 | Boyd et al. | 398/68 |
| 2011/0078755 A1* | 3/2011 | Dai | 725/111 |
| 2011/0262132 A1* | 10/2011 | Grindley et al. | 398/43 |
| 2012/0076495 A1* | 3/2012 | Kramer et al. | 398/58 |
| 2012/0257891 A1* | 10/2012 | Boyd et al. | 398/45 |
| 2012/0257893 A1* | 10/2012 | Boyd et al. | 398/58 |
| 2013/0004155 A1* | 1/2013 | Liang et al. | 398/9 |

OTHER PUBLICATIONS

Foreign Communication From a Counterpart Application, PCT Application PCT/US2012/044576, International Search Report, dated Mar. 13, 2012, 6 pages.

Foreign Communication From a Counterpart Application, PCT Application PCT/US2012/044576, Written Opinion dated Mar. 13, 2012, 10 pages.

"HomePNA Modem for MDU Endpoints," CG3310M, Sigma Designs, May 21, 2012, 2 pages.

"DOCSIS EoC for EPON in China," Otober 2010, 14 pages.

* cited by examiner

METHOD OF PROVIDING END-TO END CONNECTION IN A UNIFIED OPTICAL AND COAXIAL NETWORK

CROSS-REFERENCE TO RELATED APPLICATIONS

The present application claims the benefit of U.S. Provisional Patent Application No. 61/502,273 filed Jun. 28, 2011 by Haixiang Liang, et al. and entitled "A Method of Providing End-to-End Connection in a Unified Optical and Coaxial Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet passive optical network (EPON) is a PON standard developed by the Institute of Electrical and Electronics Engineers (IEEE) and specified in IEEE 802.3ah, which is incorporated herein by reference as if reproduced in its entirety. It provides a simple and flexible way of using optical fiber as last mile broadband service.

A single fiber can be used for both the upstream and the downstream transmission with different wavelengths. The Optical Line Terminal (OLT) implements an EPON Media Access Control (MAC) layer for transmission of Ethernet Frames. The Multi-Point Control Protocol (MPCP) performs the bandwidth assignment, bandwidth polling, auto-discovery and ranging. Ethernet frames are broadcasted downstream based on the Logical Link Identifier (LLID) embedded in the preamble frame. Upstream bandwidth is assigned based on the exchange of Gate and Report message between OLT and Optical Network Unit (ONU).

Ethernet over Coax (EoC) is a generic name used to describe all technologies which can be used for transmission of Ethernet frames over coax cable. The name comes from the fact that, except for Data Over Cable Service Interface Specification (DOCSIS), all these technologies have in common that the Ethernet Frames are transmitted in the MAC layer.

SUMMARY

In one embodiment, the disclosure includes a method in a network device for providing end-to-end connection in a unified optical and coax network, comprising receiving at an integrated node device (IND) a frame from an optical line terminal (OLT), wherein the frame comprises a data frame and a logical link identifier (LLID), and placing the data in a one of a plurality of buffers based on the LLID, wherein the one of the plurality of buffers corresponds to a customer premises equipment (CPE) associated with the LLID, wherein the data frame stays intact in a media access control (MAC) layer.

In another embodiment, the disclosure includes a method for establishing a connection between a customer premises equipment (CPE) and an optical line terminal (OLT), comprising establishing a link between the CPE and a coax physical (PHY) layer in an integrated node device (IND) under control of a coax media access control (MAC) control (CNTL), informing, with the coax MAC CNTL an Ethernet passive optical network (EPON) optical network unit in the IND to setup a link between the OLT and the ONU, establishing an EPON link with a standard EPON protocol, and transferring the EPON link information to the COAX MAC CNTL by a protocol translator.

In another embodiment, the disclosure includes a system for providing end-to-end connection in a unified optical and coax network, comprising an optical line terminal (OLT), an integrated node device (IND) coupled to the OLT, wherein the IND comprises an optical network unit (ONU), a buffer manager, and a plurality of buffers, and a plurality of customer premises equipment (CPEs), wherein the ONU is configured to receive frames from the OLT, wherein the frames comprise a data frame and a logical link identifier (LLID), wherein the buffer manager is configured to place the data frame and the coax MAC control message in one of the plurality of buffers based on the LLID wherein the one of the plurality of buffers corresponds to a one of the plurality of CPEs.

In another embodiment, the disclosure includes an integrated node device (IND) for providing end-to-end connection in a unified optical and coax network, comprising an optical network unit (ONU) for receiving a plurality of frames from and transmitting a plurality of frames to an optical line terminal (OLT), wherein each of the plurality of frames from the OLT comprise a data frame and a logical link identifier (LLID), a buffer manager, a plurality of buffers, and an Ethernet over coax (EoC) head end (HE) for receiving a plurality of frames from and transmitting a plurality of frames to a plurality of customer premises equipment (CPEs), wherein the buffer manager is configured to place the data frame from the OLT in one of the plurality of buffers based on the LLID, wherein each of the plurality of buffers corresponds to a one of the plurality of CPEs, wherein the LLID identifies a respective one of the plurality of CPEs, and wherein the EoC HE is configured to transmit the data frame from the one of the plurality of buffers to the corresponding one of the plurality of CPEs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For next generation cable access, different technologies have been proposed. One of the main architectures is EPON+ EoC, where EPON is over an optical segment and EoC is over a coaxial (wired) segment. In the optical segment, downstream data is broadcast to each ONU by the OLT, the ONU physical layer (PHY) needs to demodulate all the data and pass the data to the media access control (MAC), the MAC layer then identifies the frames targeted for the current ONU through the LLID field. The upstream data from different ONUs is sent to the OLT in time division multiple access (TDMA) burst mode. In the coax segment, the noise environment is worse compared to the optical segment. The channel capacities between the head end and the connected customer premises equipment (CPEs) are different due to interferences, noise, and loop length. It is better to use different modulations or bit loadings in an orthogonal frequency-division multiplexing (OFDM) PHY to optimally utilize the channel.

Different EoC technologies including Multimedia over Coax Alliance (MoCA), G.hn, Home PNA Alliance (HPNA), and Home Plug A/V used as in home transmission have been adapted to run the outdoor coax access from ONU to EoC Master Head End (HE) with connected CPEs located in the subscriber homes. None of these technologies offers an end to end IEEE 802.3ah Operation, Administration, and Maintenance (OAM) operation from OLT to the subscriber CPEs.

Existing solutions may include PON+DOCSIS EoC, EPON over Coaxial (EPOC), and PON+MoCA, G.hn, HPNA, or Home Plug A/V. The PON+DOCSIS EoC for EPON solution is a family of products that includes Coax Media Converter (CMC), DOCSIS cable modem, and set-top box (STB) system-on-a-chip (SoC) solutions. The PON+ DOCSIS EoC for EPON solution's CMC transmits a DOCSIS frame from the DOCSIS cable modem (CM) connected in the coaxial network to the OLT in the EPON fiber network. The EPOC solution includes an OLT, a CMC, and a CNU. EPON MAC is used end to end from the OLT in the EPON fiber network to the Coax Network Unit (CNU) in the coaxial cable network where the CMC performs medium conversion between the fiber network and coax network. The PON+ MoCA, G.hn, HPNA, or Home Plug A/V solution is offered by the rest of the EoC technology enablers. This solution simply places an ONU and a Coax Master (could be either MoCA, G.hn, HPNA, or HomePlug A/V Head End) in the CMC where the EPON MAC and the EPON OAM operate between the OLT and the ONU in the EPON fiber network and the Coax MAC and Coax OAM operate in the coax network. There is no end to end operation using EPON MAC or EPON OAM.

Each of PON+DOCSIS EoC, EPON over Coaxial (EPOC), and PON+MoCA, G.hn, HPNA, or Home Plug A/V suffer from at least one of two problems. Some of these solutions require a PON MAC layer termination at the ONU or other intermediary fiber node device. However, a PON MAC layer termination requires that the entire PON MAC layer be converted to a coax MAC layer in the intermediary device which results in a considerable amount of overhead in the intermediary device. Furthermore, the OLT cannot manage the CPEs directly. Since the coax segment is a separate Ethernet point-to-multipoint network, the end-to-end quality of service (QoS) is not guaranteed.

Other solutions (e.g., EPOC) do not require the PON MAC layer termination, but instead require that the all the CPEs receive all of the frames and that the transmission rate must be matched to that of the CPE with the slowest connection speed. The fiber node device has no scheduler. All downstream data has to be demodulated at each CPE's PHY. These EPOC solutions result in low channel usage efficiency, higher cost CPE, and no upgrade path to 10 gigabyte (G) EPON or future wavelength division multiplexing (WDM) PON.

Disclosed herein are methods, systems, and apparatuses that solve the end-to-end connection quality of service (QoS) problem by preserving the existing OAM and provisioning technologies used in EPON while optimizing the channel usage efficiency for the coax segment of the network. In an embodiment, system architecture comprising a unified fiber and coax network to enable end-to-end OAM, QoS, and provisioning, while substantially optimizing the channel usage for the coax segment is provided. The disclosed system architecture may provide better handling of the coax environment than existing systems. In an embodiment, an integrated node device (IND) is provided to couple an OLT with a plurality of EoC CPEs. The IND may comprise an ONU and an EoC HE. In an embodiment, the IND receives EPON frames from the OLT and separates the frames based on the LLID of each frame into corresponding buffers targeted for each CPE. The schedule and transmission of data to each CPE or group of CPEs is determined using selected modulation substantially optimized for the channel(s) associated with the targeted CPE. The data frames stay intact in the MAC layer so that the EPON OAM and provisioning messages go to the corresponding CPE. OAM and Provisioning messages targeted to each CPE are terminated in that CPE and not the EoC HE. Thus, end-to-end EPON OAM and Provisioning is provided without undue overhead placed on the IND.

Figure 1:
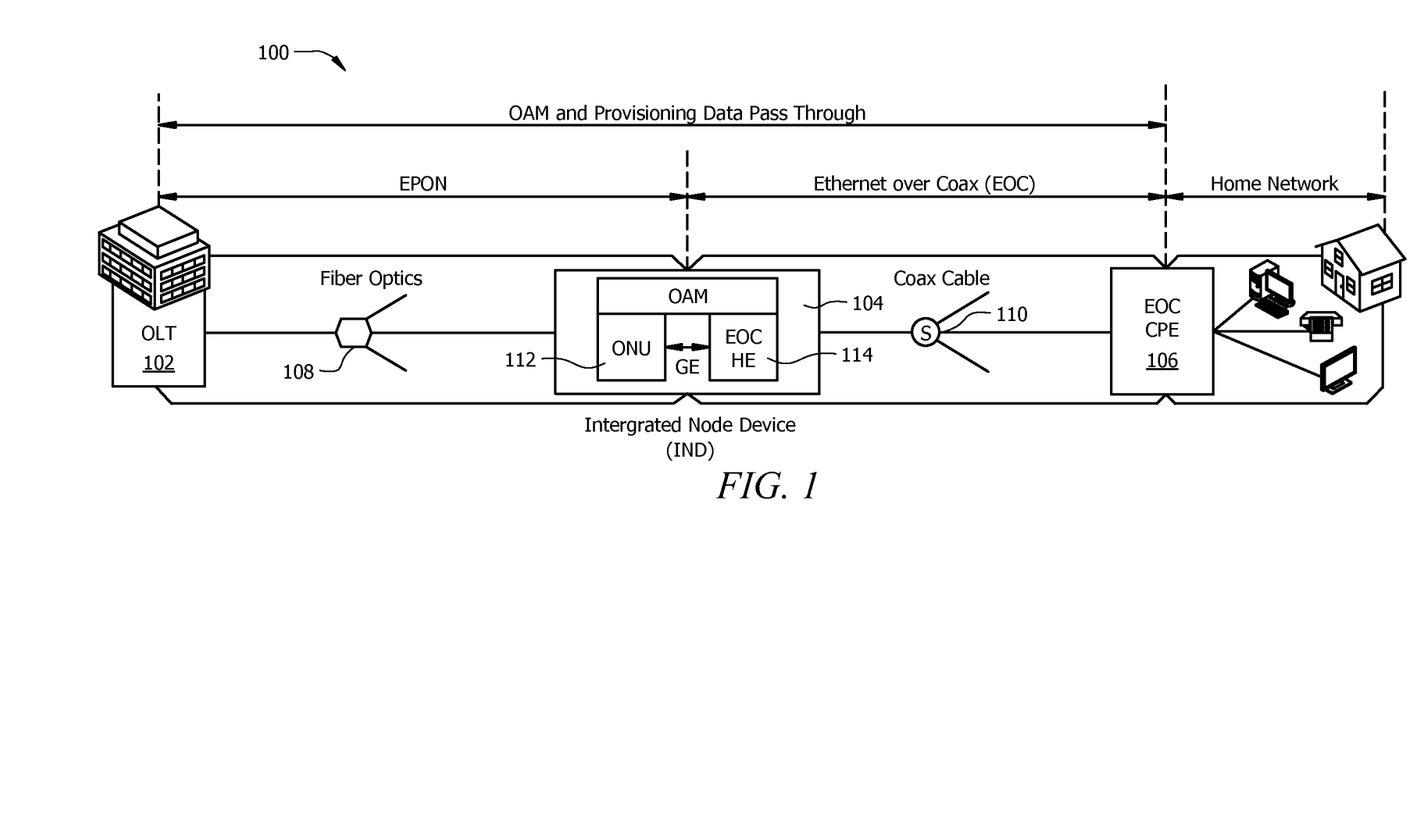
FIG. 1 is a diagram of an exemplary EPON+EoC system according to an embodiment of the disclosure.

FIG. 1 depicts an exemplary EPON+EoC system 100 according to an embodiment. EPON+EoC system 100 may comprise an OLT 102, an Integrated Node Device (IND) 104, and a plurality of EoC CPEs 106. The IND 104 may be coupled to the OLT 102 by fiber optics 108. The IND 104 may be coupled to the EoC CPEs 106 by coax cable 110.

IND 104 may comprise an optical network unit (ONU) 112 and an EoC head end (HE) 114. The OLT 102 may directly manage each EoC CPE 106 through the IND 104. The coax MAC control emulates the EPON MAC control. The upstream frames from CPEs 106 may be scheduled and received by the EoC HE 114. The downstream data frames from the OLT 102 may be received by the ONU 112 and processed by the EoC HE 114. The EoC HE 114 processes the data frames received by the ONU as follows. First, it separates the frames from LLID to different buffers targeted for each CPE. Second, it schedules and transmits data to each CPE 106 or group of CPEs 106 using selected modulation optimized for the channel(s). Third, the data frames stay intact in the MAC layer so that EPON OAM and Provisioning messages go to the corresponding CPE 106. Fourth, the OAM and provisioning messages targeted to each CPE 106 are terminated in that CPE 106, not the EoC HE 114.

Transmission between EoC HE 114 and each CPE 106 may be optimized according to the corresponding channel. Each CPE PHY layer only receives data frames targeted for the CPE 106. The analog front end (AFE) does not have to cover the whole spectrum if bonding is used in the PHY. The digital demodulation portion processes its own data. This results in lower cost and lower power on the CPE 106.

Data frames may stay intact from the fiber to the coax cable. LLIDs (or their unique replacements) are transferred to the CPEs 106. OAM and provisioning frames pass through the IND 104 to the corresponding CPE 106. Downstream data frames in the PHY layer convert from broadcasts mode on the fiber to unicast or multicast mode on the coax cable based on LLID to optimize efficiency on the coax cable and reduce CPE 106 PHY demodulation requirements.

Figure 2:
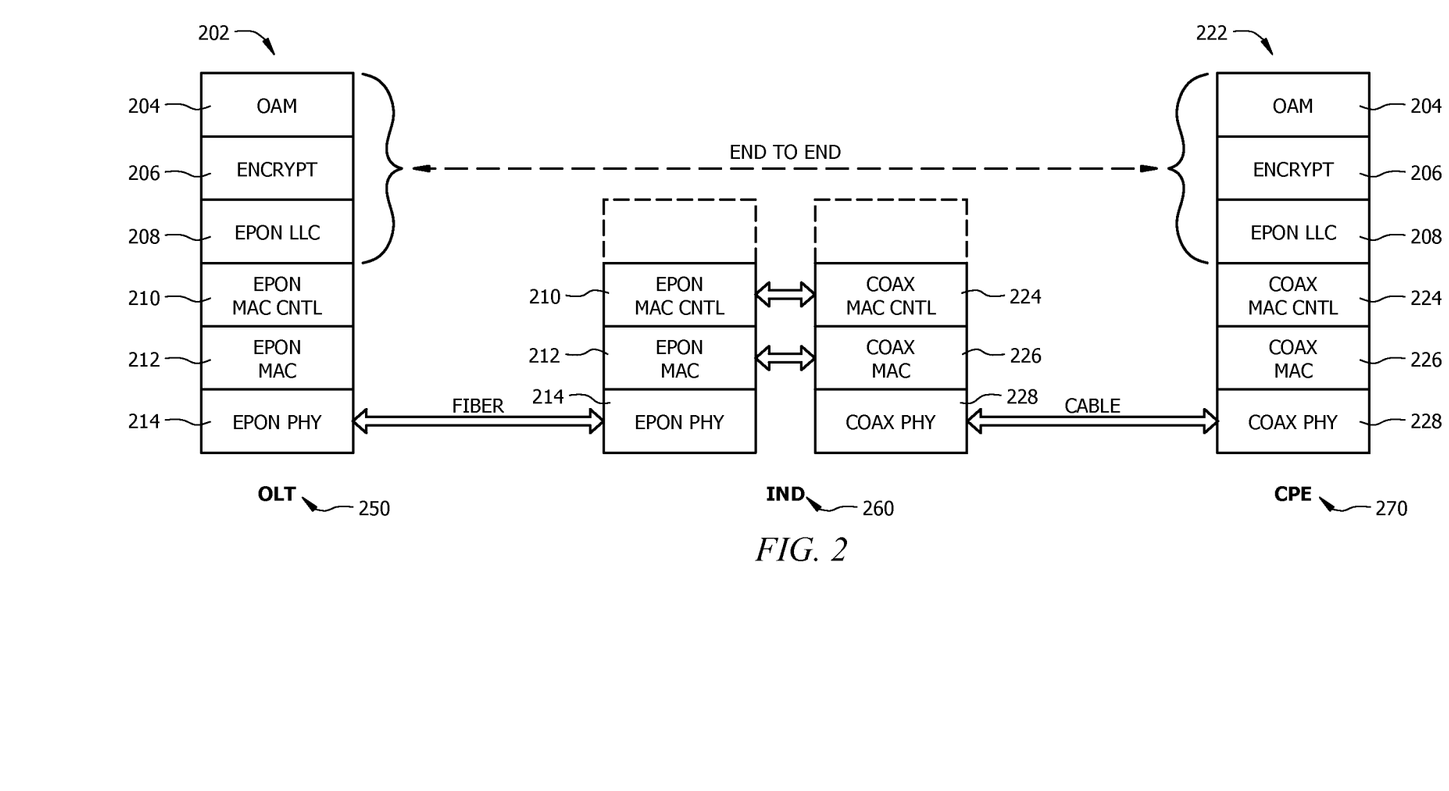
FIG. 2 is a schematic diagram illustrating some of the protocol stacks implemented according to an embodiment of the disclosure.

FIG. 2 is a block diagram illustrating some of the protocol stacks implemented according to an embodiment. Protocol stack 202 at the OLT 250 may include an OAM field 204, an Encrypt field 206, an EPON logical link control (LLC) field 208, an EPON MAC CNTL field 210, an EPON MAC field 212, and an EPON PHY field 214. Protocol stack 222 at the CPE 260 may include the OAM field 204, the Encrypt field 206, the EPON LLC field 208, a coax MAC CNTL field 224, a coax MAC field 226, and a coax PHY filed 228. In the IND 260, the EPON MAC field 212 and the coax MAC field 226 may directly interact with each other to transfer data frames. The coax MAC CNTL field 224 emulates the EPON MAC CNTL field 210 to schedule data traffic on the coax cable medium to optimally utilize the corresponding channels between the EOC HE and each of the CPEs 270.

Figure 3:
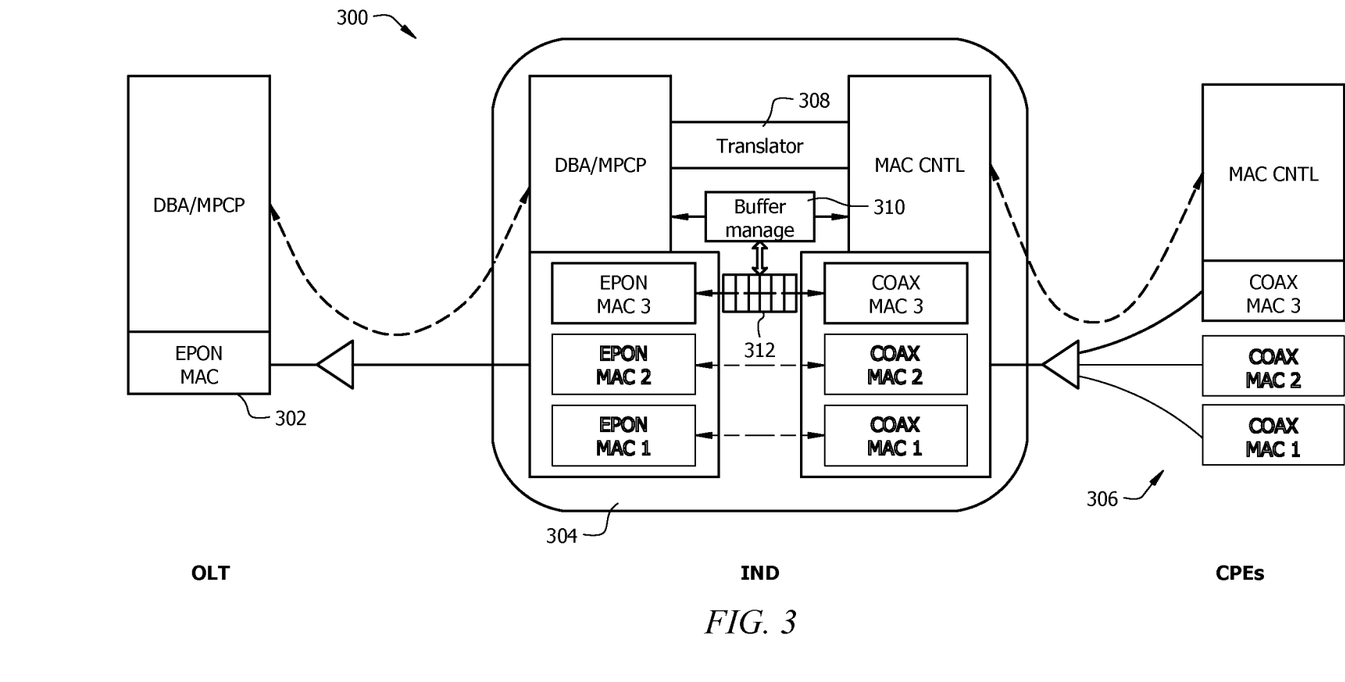
FIG. 3 is a schematic diagram of an exemplary system illustrating a method to implement the MAC controls in the IND according to an embodiment of the disclosure.

FIG. 3 is a block diagram of an exemplary system 300 illustrating a method to implement the MAC controls in the IND according to an embodiment. System 300 may comprise an OLT 302, an IND 304, and a plurality of CPEs 306. IND 304 may comprise a translator 308, a buffer manager 310, and a plurality of buffers 312. The connection between IND 304 and the OLT 302 may comprise optical fiber. The connection between IND 304 and each of the plurality of CPEs 306 may comprise coax connections. In system 300, EPON dynamic bandwidth allocation (DBA) and EPON MPCP may be terminated at IND 304 EPON interface. A new MAC CNTL (Coax DBA and Coax MPCP) may be built in the IND 304 based on the EPON DBA and MPCP to reschedule the traffic from/to CPEs 306. Some control messages of EPON may be transported to COAX MAC control by a translator 308. Different service groups of COAX are in different collision domains since the EPON MPCP protocol is terminated in the IND 304. Coax MAC control may act as a slave for the EPON DBA and MPCP. Thus, all traffic in the end-to-end system may be controlled by the OLT 302.

Figure 4:
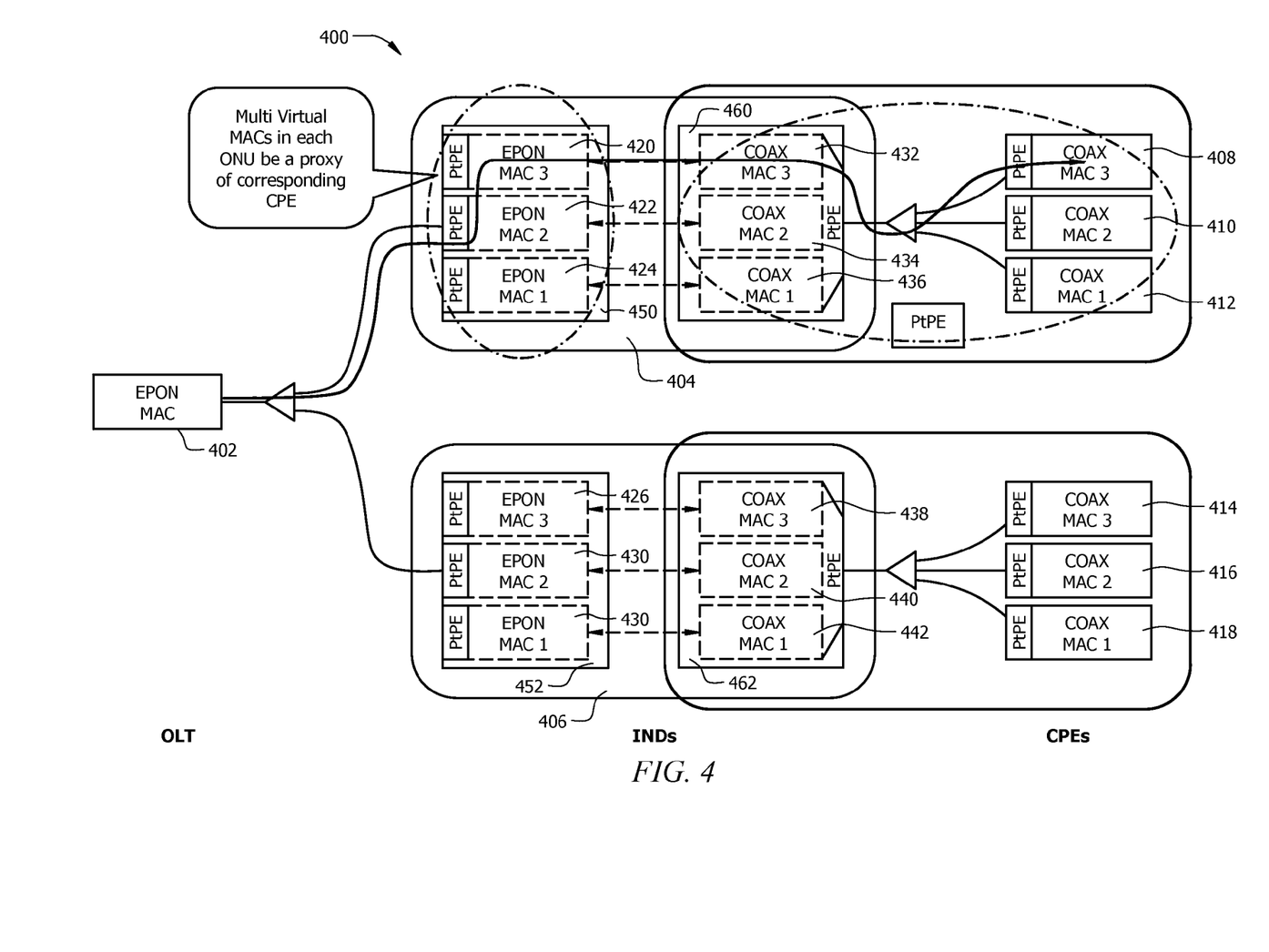
FIG. 4 is a schematic diagram of a system for point-to-point end-to-end connection in a unified optical and coax network according to an embodiment of the disclosure.

FIG. 4 is a schematic diagram of a system 400 for point-to-point end-to-end connection in a unified optical and coax network. System 400 may comprises an OLT 402, INDs 404, 406, and CPEs 408, 410, 412, 414, 416, 418. Each IND 404, 406 may comprise an ONU 450, 452 and an EoC HE 460, 462. Each ONU 450, 452 may comprise multiple virtual EPON MACs 420, 422, 424, 426, 428, 430. Each EoC HE 460, 462 may comprise multiple Coax MACs 432, 434, 436, 438, 440, 442 each corresponding to a respective one of the virtual EPON MACs 420, 422, 424, 426, 428, 430. Each virtual EPON MAC 420, 422, 424, 426, 428, 430 corresponds to a respective one of the CPEs 408, 410, 412, 414, 416, 418 as shown. In system 400, the MAC controls are implemented by terminating the EPON DBA and MPCP in the CPEs 408, 410, 412, 414, 416, 418. The delay in the coax cable segment is set with a fixed value to allow upstream data from the CPEs 408, 410, 412, 414, 416, 418 to get to the IND 404, 406 before scheduling on the fiber. As in EPON, the disclosed system 400 architecture emulates Point-to-Point connections between the OLT 402 and each CPE 408, 410, 412, 414, 416, 418. The multiple virtual MACs 420, 422, 424, 426, 428, 430 in each ONU 450, 452 (within the IND 404, 406) act as proxies for the connected CPEs 408, 410, 412, 414, 416, 418.

Figure 5:
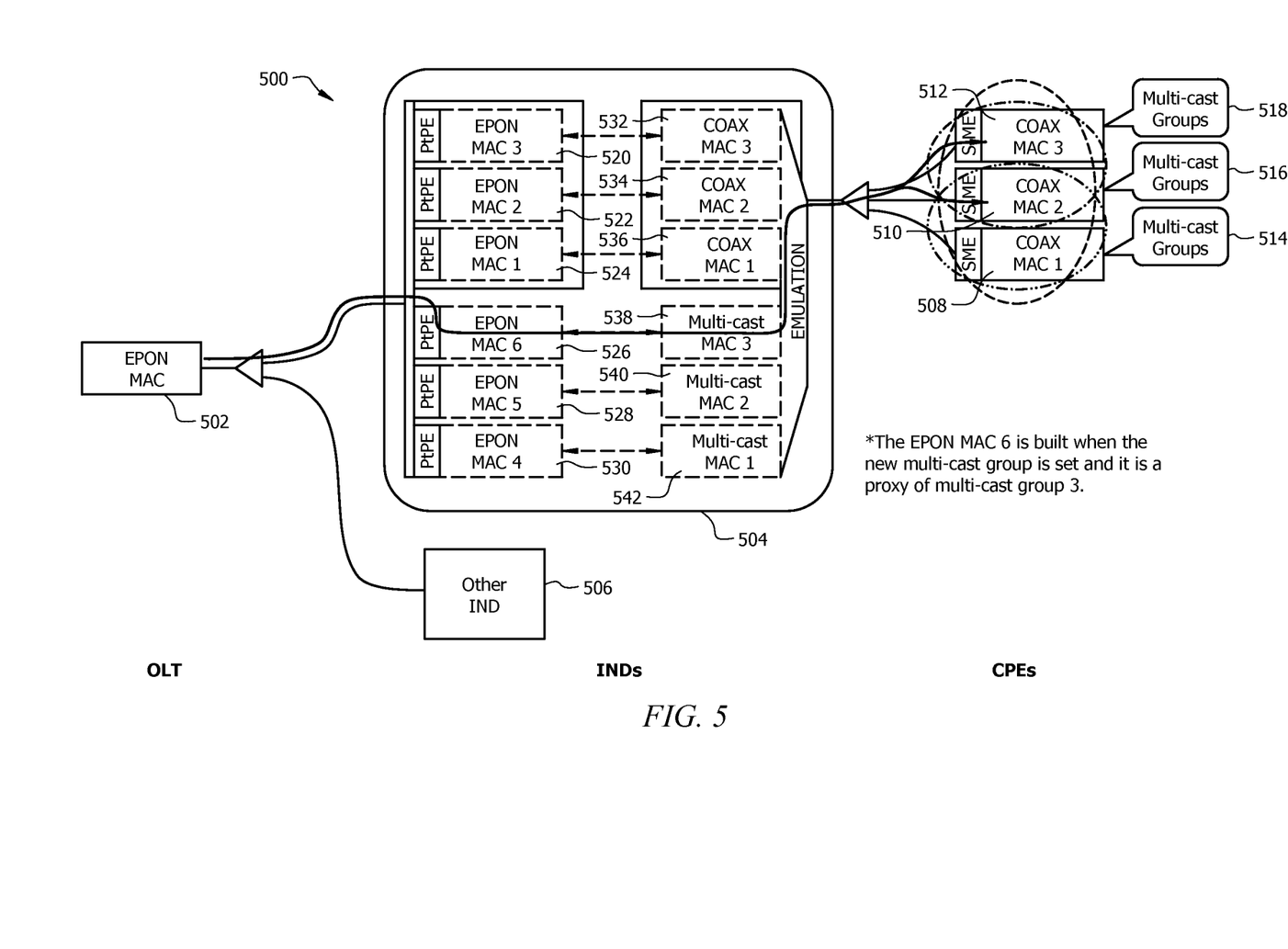
FIG. 5 is a schematic diagram illustrating a multicasting system for end-to-end connection in a unified optical and coax network according to an embodiment of the disclosure.

Multicast under this system 400 architecture may be accommodated similarly through the virtual MAC concept as shown in FIG. 5. FIG. 5 is a schematic diagram illustrating a multicasting system 500 in a unified optical and coax network according to an embodiment of the disclosure. Multicasting system 500 may comprise an OLT 502, a plurality of INDs 504, 506, and a plurality of CPEs 508, 510, and 512. CPE 508 may be a member of multicast group one 514, and multicast group three 518. CPE 510 may be a member of multicast group one 514, multicast group two 516, and multicast group three 518. CPE 512 may be a member of multicast group two 516 and multicast group three 518.

IND 504 may comprise a plurality of EPON MACs 520, 522, 524, 526, 528, 530, a plurality of coax MACs 532, 534, 536, and a plurality of multicast coax MACs 538, 540, 542. EPON MAC 6 526 may be built by the IND 504 when the new multicast group three 518 is set and it is a proxy of multicast group three 518. Frames sent by OLT 502 intended for multicast group three 518 are received by IND 504 and the EPON DBA and EPON MPCP messages in the frames converted by virtual EPON MAC 6 526 to coax DBA and MPCP messages and forwarded to the CPEs 510, 512 that are members of multicast group three 518.

Figure 6:
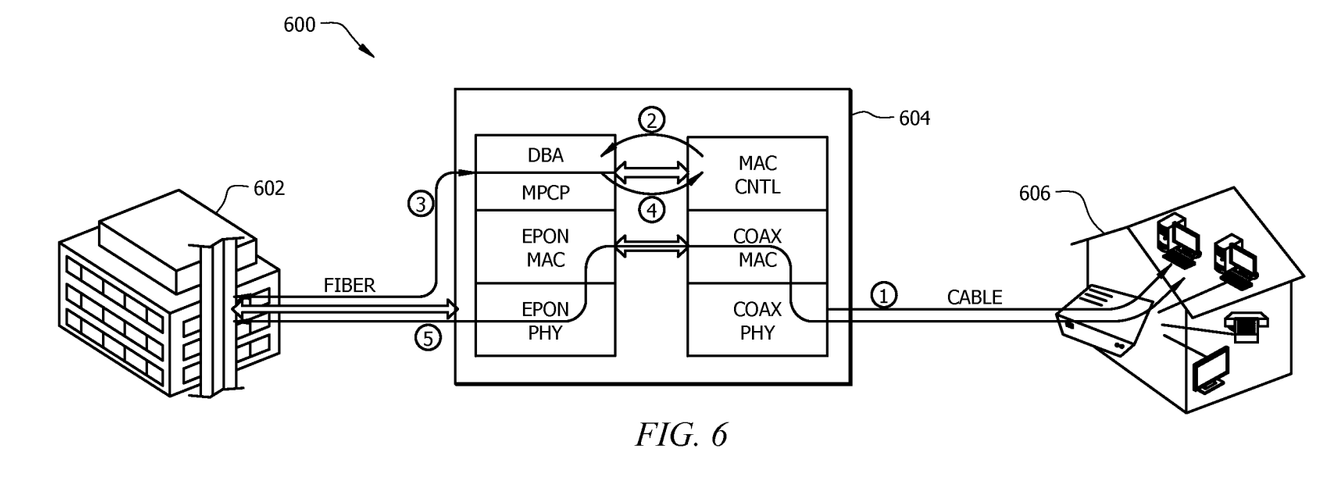
FIG. 6 is a schematic diagram illustrating a method for establishing a connecting between a new CPE and an OLT according to an embodiment of the disclosure.

FIG. 6 is a block diagram illustrating a method 600 for establishing a connecting between a new CPE and an OLT according to an embodiment of the disclosure. At step one, a link between a new CPE 606 and the COAX PHY in the IND 604 is established under the control of COAX MAC control (CNTL), including time and symbol synchronization, training, modulation selection, etc. Next, in step two, the COAX MAC CNTL informs EPON ONU in the IND 604 to setup a new link between the OLT 602 and the ONU in the IND 604. At step three, a new EPON link is setup with the standard EPON protocol and LLID(s) is/are assigned. At step four, the EPON link information is transferred to COAX MAC CNTL directly by the protocol translator in the IND 604. Finally, at step five, a link between the OLT 602 and the CPE 606 is established through the IND 604.

Figure 7:
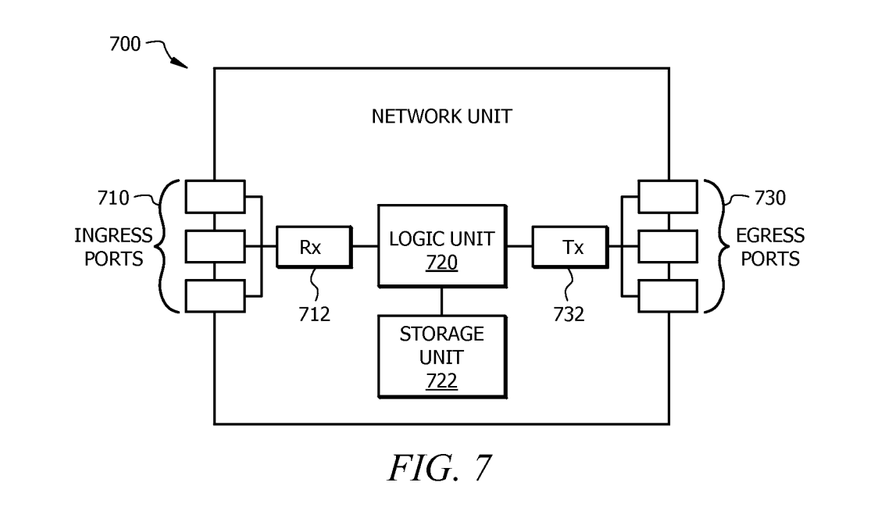
FIG. 7 is a schematic diagram of an embodiment of a network unit according to an embodiment of the disclosure.

FIG. 7 illustrates an embodiment of a network unit 700, which may be any device that transports and processes data through the network. For instance, the network unit 700 may correspond to or may be located at an IND, such as any of INDs 104, 260, 304, 404, 406, 504, 506, or 604, in an end-to-end connected in a unified optical and coax network. The network unit 700 may comprise one or more ingress ports or units 710 coupled to a receiver (Rx) 712 for receiving signals and frames/data from other network components. Ingress ports 710 may comprise both optical fiber ports and coax ports and Rx 712 may comprise an optical receiver and an electrical receiver. The network unit 700 may comprise a logic unit 720 to determine which network components to send data to. The network unit 700 may comprise storage unit 722. For example, buffers 312 may be implemented in storage unit 722. The logic unit 720 may be implemented using hardware, software, or both. The network unit 700 may also comprise one or more egress ports or units 730 coupled to a transmitter (Tx) 732 for transmitting signals and frames/data to the other network components. The egress ports 730 may comprise both optical fiber ports and coax ports and Tx 732 may comprise an optical transmitter and an electrical transmitter. The receiver 712, logic unit 720, storage unit 722 and transmitter 732 may also implement or support the end-to-end connection in a unified optical and coax network method, schemes, and systems described above. The components of the network unit 700 may be arranged as shown in FIG. 7.

Figure 8:
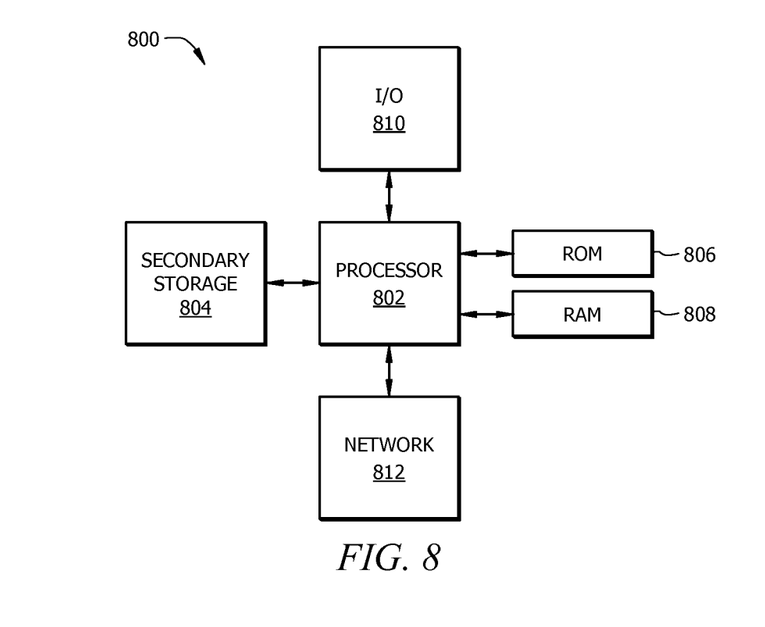
FIG. 8 illustrates a typical, general-purpose network component suitable for implementing one or more embodiments of the components disclosed herein.

The network components and devices described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application-specific integrated circuits (ASICs) or digital signal processors (DSPs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method in a network device for providing end-to-end connection in a unified optical and coax network, comprising:
   receiving at an integrated node device (IND) an Ethernet passive optical network (EPON) multi-point control protocol (MPCP) message from an optical line terminal (OLT);
   scheduling coax data communications by forwarding to a customer premises equipment (CPE) a coax MPCP message that emulates the EPON MPCP message;
   receiving at the IND a data frame from an optical line terminal (OLT), wherein the data frame comprises data and a logical link identifier (LLID) associated with the CPE;
   placing the data frame in one of a plurality of buffers based on the LLID, wherein one of the plurality of buffers corresponds to the CPE, wherein the data frame stays intact in a media access control (MAC) layer;
   transmitting the data frame to the CPE from the IND using modulation substantially optimized for a channel to the CPE,
   wherein the transmitted data frame comprises the LLID from the OLT.

2. The method of claim 1, wherein the frame comprises a passive optical network (PON) scheduling message, and wherein the method further comprises translating with a processor the PON scheduling message into a coax scheduling message.

3. The method of claim 1, wherein Operation, Administration, and Maintenance (OAM) and provisioning messages are targeted to the CPE, pass through the IND, and are terminated at the CPE.

4. The method of claim 1, further comprising performing coax dynamic bandwidth allocation (DBA) based on EPON DBA information received from the OLT.

5. The method of claim 4, further comprising building a coax MAC control in the IND to manage conversion between coax MPCP and coax DBA based on EPON MPCP and EPON DBA.

6. A system for providing end-to-end connection in a unified optical and coax network, comprising:
an optical line terminal (OLT);
an integrated node device (IND) coupled to the OLT, wherein the IND comprises:
an optical network unit (ONU), a buffer manager, and a plurality of buffers; and
an Ethernet over coax (EoC) head end (HE); and
a plurality of customer premises equipment (CPEs),
wherein the ONU is configured to receive frames from the OLT,
wherein the frames comprise a data frame and a logical link identifier (LLID),
wherein the EoC HE is configured to schedule and transmit the data frame to at least one of the CPEs using modulation substantially optimized for a channel to the CPE,
wherein the buffer manager is configured to place the data frame and a coax media access control (MAC) control message in one of the plurality of buffers based on the LLID wherein the one of the plurality of buffers corresponds to a one of the plurality of CPEs, and
wherein the IND is configured to receive downstream data frames in a physical (PHY) layer in a broadcast mode from a fiber and convert the downstream data frames to a multicast mode on a coax cable based on the LLID by transmitting the downstream data frames to all members of an associated multicast group, and
wherein Operation, Administration, and Maintenance (OAM) messages and provisioning messages are each targeted to one of the plurality of CPEs, pass through the IND, and are terminated at the targeted CPE.

7. The system of claim 6, wherein each of the frames further comprise an Ethernet passive optical network (EPON) media access control (MAC) control message, wherein the IND further comprises a translator, and wherein the translator is configured to build the coax MAC control message based on the EPON MAC control message.

8. The system of claim 6, wherein the ONU comprises a plurality of virtual MACs that each act as a proxy to a corresponding one of a plurality of CPEs so that the one of the plurality of CPEs is visible to and manageable by the OLT.

9. The system of claim 6, wherein a delay in a coax cable segment is set with a fixed value to allow upstream data from a one of the plurality of CPEs to arrive at the IND before scheduling on a fiber to the OLT.

10. The system of claim 6, wherein the data frame stays intact from an optical fiber to a coax cable.

11. The system of claim 7, wherein the coax MAC control acts as a slave for the EPON MAC control message.

12. The system of claim 6, wherein at least one downstream data frame in a physical (PHY) layer is converted from a broadcast mode on a fiber to a unicast mode on a coax cable based on the LLID to substantially optimize efficiency on the coax cable and to reduce CPE PHY demodulation requirements.

13. An integrated node device (IND) for providing end-to-end connection in a unified optical and coax network, comprising:
an optical network unit (ONU) for receiving a plurality of frames from and transmitting a plurality of frames to an optical line terminal (OLT), wherein each of the plurality of frames from the OLT comprise a data frame and a logical link identifier (LLID);
a buffer manager;
a plurality of buffers; and
an Ethernet over coax (EoC) head end (HE) for receiving a plurality of frames from and transmitting a plurality of frames to a plurality of customer premises equipment (CPEs),
wherein the buffer manager is configured to place the data frame from the OLT in one of the plurality of buffers based on the LLID,
wherein each of the plurality of buffers corresponds to a one of the plurality of CPEs,
wherein the LLID identifies a respective one of the plurality of CPEs,
wherein the EoC HE is configured to schedule and transmit the data frame from the one of the plurality of buffers to the corresponding one of the plurality of CPEs using modulation substantially optimized for a channel to the CPE,
wherein the EoC HE is further configured to receive downstream data frames in a physical (PHY) layer in a broadcast mode from a fiber and convert the downstream data frames to a multicast mode on a coax cable based on the LLID by transmitting the downstream data frames to all members of an associated multicast group, and
wherein Operation, Administration, and Maintenance (OAM) messages and provisioning messages are each targeted to one of the plurality of CPEs, pass through the IND, and are terminated at the targeted CPE.

14. The IND of claim 13, wherein each of the frames further comprise an Ethernet passive optical network (EPON) media access control (MAC) control message, and wherein the IND further comprises a translator configured to build a coax MAC control message based on the EPON MAC control message.

15. The IND of claim 13, wherein the ONU comprises a plurality of virtual media access control (MACs) that each act as a proxy to a corresponding one of plurality of CPEs so that the one of the plurality of CPEs is visible to and manageable by the OLT.

16. The IND of claim 13, wherein a delay in a coax cable segment is set with a fixed value to allow upstream data from a one of the plurality of CPEs to arrive at the IND before scheduling on a fiber to the OLT.

17. The IND of claim 13, wherein the data frame stays intact from an optical fiber to a coax cable.

18. The IND of claim 14, wherein the coax MAC control acts as a slave for the EPON MAC control message.

19. The IND of claim 13, wherein at least one downstream data frame in a physical (PHY) layer is converted from a broadcast mode on a fiber to a unicast mode on a coax cable based on the LLID to substantially optimize efficiency on the coax cable and to reduce CPE PHY demodulation requirements.

20. An apparatus comprising:
a first interface configured to connect to an Ethernet Passive Optical Network (EPON);
a second interface configured to connect to a EPON over Coaxial (EPoC) network; and a processor coupled to the interfaces and configured to cause the apparatus to:

forward Operation, Administration, and Maintenance (OAM) frames between the EPON network and the EPoC network, wherein the apparatus does not terminate an OAM management domain for Customer Premises Equipment (CPEs) coupled to the EPoC network; and place received frames in queues associated with logical links until the associated logical link is scheduled for transmission.

21. The apparatus of claim 20, wherein the processor is further configured to cause the apparatus to support downstream multicast transmission by transmitting to multicast service groups based on frame Logical Link Identifiers (LLIDs).

* * * * *